(12) United States Patent
Messer et al.

(10) Patent No.: US 11,184,762 B1
(45) Date of Patent: Nov. 23, 2021

(54) COMPUTE SYSTEM WITH ANONYMIZATION MECHANISM AND METHOD OF OPERATION THEREOF

(71) Applicant: MOJ.IO, Inc., Vancouver (CA)

(72) Inventors: Alan Messer, Los Gatos, CA (US); Yazdan Jamshidikhezeli, Campbell, CA (US)

(73) Assignee: MOJ.IO, Inc., Vancouver (CA)

( * ) Notice: Subject to any disclaimer, the term of this patent is extended or adjusted under 35 U.S.C. 154(b) by 0 days.

(21) Appl. No.: 16/913,440

(22) Filed: Jun. 26, 2020

(51) Int. Cl.
  *H04W 12/02* (2009.01)
  *G01C 21/36* (2006.01)
  *H04W 12/63* (2021.01)

(52) U.S. Cl.
  CPC ........ *H04W 12/02* (2013.01); *G01C 21/3605* (2013.01); *H04W 12/63* (2021.01)

(58) Field of Classification Search
  CPC ... H04W 12/02; H04W 12/63; G01C 21/3605
  USPC ......................................................... 455/411
  See application file for complete search history.

(56) References Cited

U.S. PATENT DOCUMENTS

| | | | |
|---|---|---|---|
| 9,319,876 B2 | 4/2016 | Arunkumar et al. | |
| 9,414,194 B2 | 8/2016 | Frank et al. | |
| 2003/0130893 A1 | 7/2003 | Farmer | |
| 2009/0315776 A1 | 12/2009 | Khosravy et al. | |
| 2013/0269038 A1* | 10/2013 | Takahashi | H04L 9/32 726/26 |
| 2014/0274157 A1 | 9/2014 | Frank et al. | |
| 2015/0350890 A1 | 12/2015 | Arunkumar et al. | |

FOREIGN PATENT DOCUMENTS

WO   2015072084 A1   5/2015

* cited by examiner

*Primary Examiner* — Joel Ajayi
(74) *Attorney, Agent, or Firm* — Perspectives Law Group, Corp.

(57) ABSTRACT

A method of operation of a compute system includes: receiving a current location of a device; determining a recurrence of the current location within a recurrent region in real-time; generating an anonymization of the current location based on the recurrence and when the current location is within the recurrent region; and reporting the anonymization in the real-time for a privacy protection.

15 Claims, 7 Drawing Sheets

COMPUTE SYSTEM WITH ANONYMIZATION MECHANISM AND METHOD OF OPERATION THEREOF

TECHNICAL FIELD

An embodiment of the present invention relates generally to a compute system, and more particularly to a system with an anonymization mechanism for location.

BACKGROUND ART

Modern systems, especially compute systems are providing increasing levels of functionality to support modern life including additional status monitoring, connectivity services, and location-based information services. Technology has enabled increased personalization for health and medical services and delivery as well as other services. Delivery of real-time personalization are still challenging, especially in light of the need for privacy. Research and development in the existing technologies can take a myriad of different directions.

Thus, a need still remains for a compute system with an anonymization mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a method of operation of a compute system including: receiving a current location of a device; determining a recurrence of the current location within a recurrent region in real-time; generating an anonymization of the current location based on the recurrence and when the current location is within the recurrent region; and reporting the anonymization in the real-time for a privacy protection.

An embodiment of the present invention provides a compute system, including: a communication circuit configured to: receive a current location of a device; a control circuit, coupled to the communication circuit, configured to: determine a recurrence of the current location within a recurrent region in real-time, generate an anonymization of the current location based on the recurrence and when the current location is within the recurrent region, and report the anonymization in the real-time for a privacy protection.

An embodiment of the present invention provides a non-transitory computer readable medium including instructions for a compute system, including: receiving a current location of a device; determining a recurrence of the current location within a recurrent region in real-time; generating an anonymization of the current location based on the recurrence and when the current location is within the recurrent region; and reporting the anonymization in the real-time for a privacy protection.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
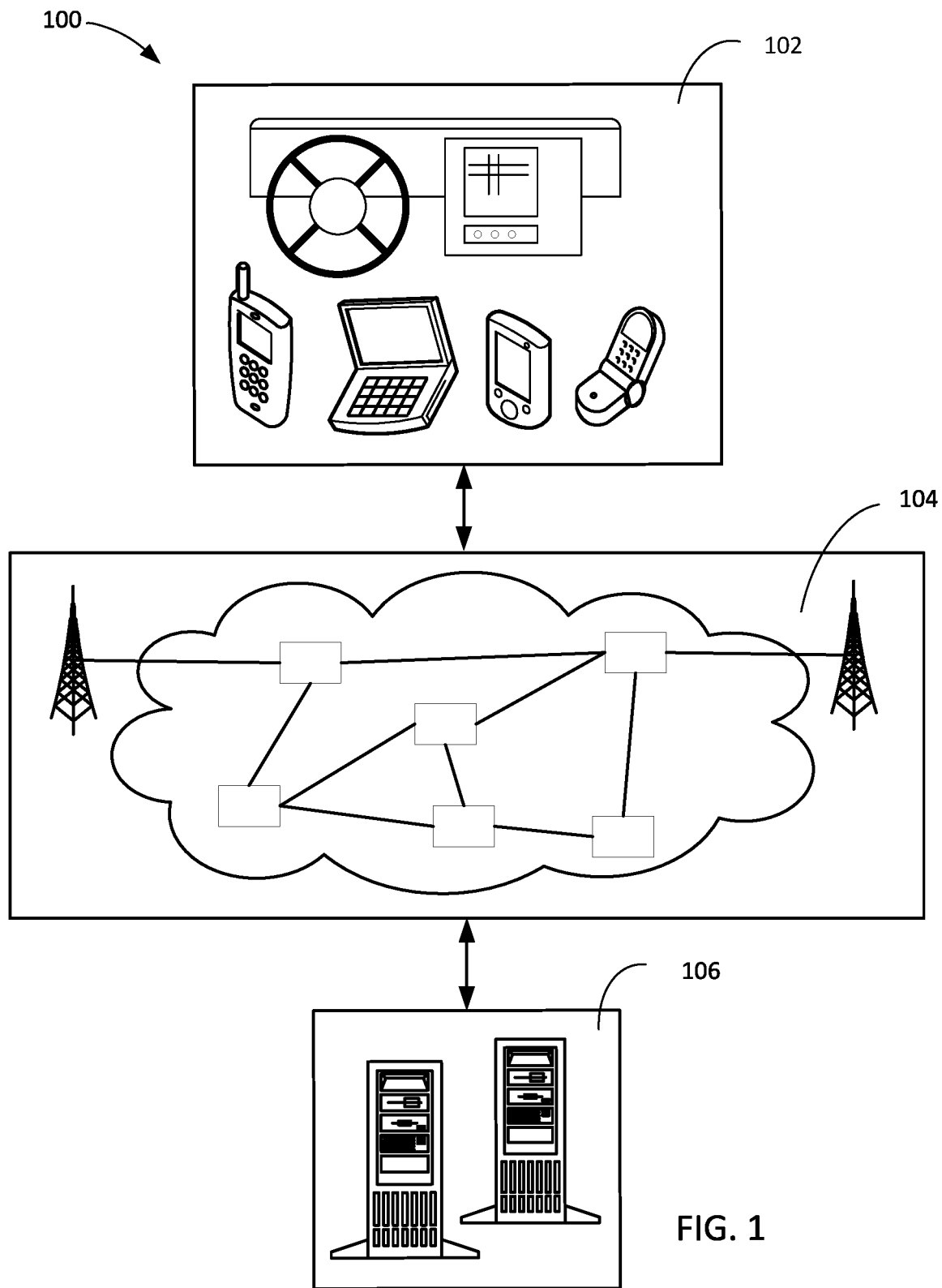
FIG. 1 is a compute system with an anonymization mechanism in an embodiment of the present invention.

Embodiments provide a compute system that also solves the problem of efficiently allowing the calculation of areas to be dropped from the location trace for the current location for the travel route, such as trips. The compute system does not require comparison to road databases so that location information is only stored for major roads. The compute system avoids and eliminates offline processing (e.g. overnight) and provides the anonymization in the real-time while avoiding an expensive and slow map database lookup.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention can be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention. The terms first, second, etc. can be used throughout as part of element names and are used as a matter of descriptive convenience and are not intended to have any other significance or provide limitations for an embodiment.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium including instructions for performing the software function, a portion therein, or a combination thereof to control one or more of the hardware units or circuits. Further, if a module is written in the apparatus claims section below, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be physical contact or by communication between items.

Referring now to FIG. 1, therein is shown a compute system 100 with an anonymization mechanism in an embodiment of the present invention. The compute system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a vehicle, a telematics system in a vehicle, a computing device, a cellular phone, a tablet computer, a smart phone, a notebook computer, vehicle embedded navigation system, or a dongle or device that plugs into a vehicle. The first device 102 can couple, either directly or indirectly, to the communication path 104 to communicate with the second device 106 or can be a stand-alone device.

The second device 106 can be any of a variety of centralized or decentralized computing devices, sensor devices to take measurements or record environmental information, such as sensor instruments, sensor equipment, or a sensor array. For example, the second device 106 can be a multimedia computer, a laptop computer, a desktop computer, grid-computing resources, a virtualized computer resource, cloud computing resource, routers, switches, peer-to-peer distributed computing devices, a vehicle, or a combination thereof.

The second device 106 can be mounted externally or internally to a vehicle, centralized in a single room or within a vehicle, distributed across different rooms, distributed across different geographical locations, embedded within a telecommunications network. The second device 106 can couple with the communication path 104 to communicate with the first device 102.

For illustrative purposes, the compute system 100 is described with the second device 106 as a computing device, although it is understood that the second device 106 can be different types of devices, such as a standalone sensor or measurement device. Also for illustrative purposes, the compute system 100 is shown with the second device 106 and the first device 102 as end points of the communication path 104, although it is understood that the compute system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
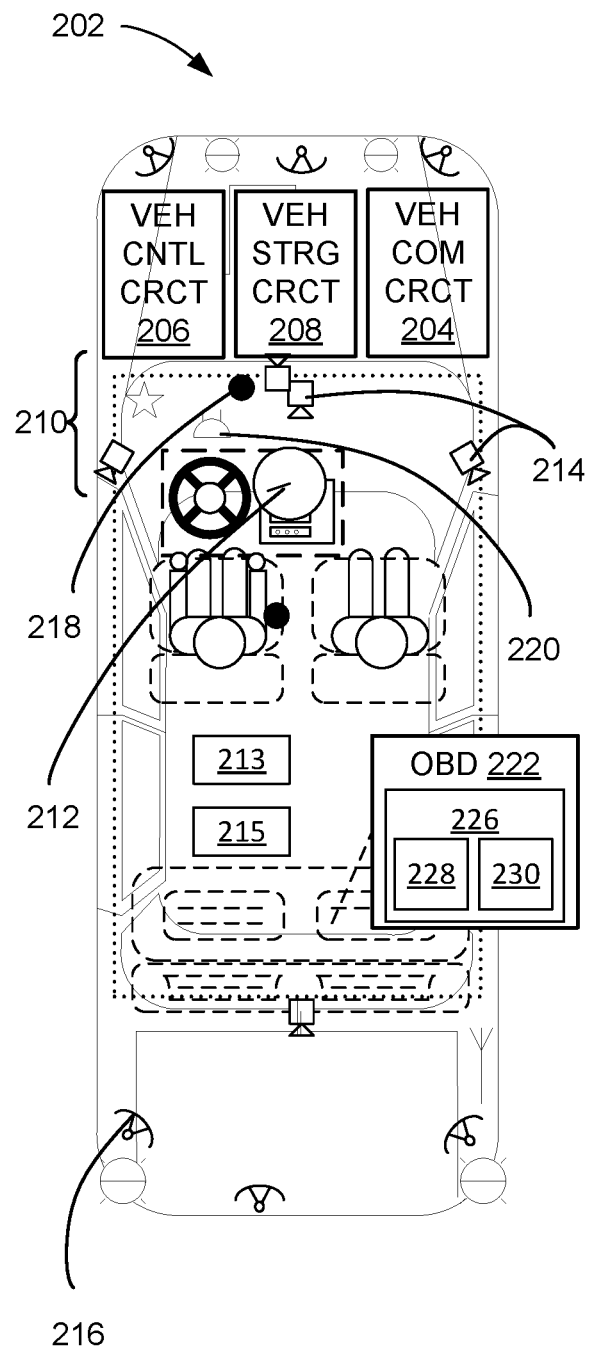
FIG. 2 is an example a top plan view of a vehicle for the compute system.

Referring now to FIG. 2, therein is shown an example a top plan view of various a vehicle 202 for the compute system 100 of FIG. 1. As an example, the compute system 100 can include or interact with the first device 102 of FIG. 1 the vehicle 202. The vehicle 202 can also include one or more of environmental sensors 210. The vehicle 202 is an object or a machine used for transporting people or goods. The vehicle 202 can also be capable of providing assistance in maneuvering or operating the object or the machine.

The vehicle 202 can include or represent different types of vehicles. For example, the vehicle 202 can be an electric vehicle, a combustion vehicle, or a hybrid vehicle. Also for example, the vehicle 202 can be an autonomous vehicle or non-autonomous vehicle. As a specific example, the vehicle 202 can include a car, a truck, a cart, or a combination thereof.

The vehicle 202 can include a device, a circuit, one or more specific sensors, or a combination thereof for providing assistance or additional information to control, maneuver, or operate the vehicle 202. The vehicle 202 can include a vehicle communication circuit 204, a vehicle control circuit 206, a vehicle storage circuit 208, other interfaces, or a combination thereof.

The vehicle 202 can also include on-board diagnostics 222 (OBD) that can be accessed by the vehicle control circuit 206. As an example, the vehicle control circuit 206 can access the on-board diagnostics 222 with the vehicle communication circuit 204. The vehicle 202 can store and retrieve the on-board diagnostics 222 to and from the vehicle storage circuit 208.

The on-board diagnostics 222 represent information about the vehicle 202. For example, the on-board diagnostics 222 can provide status or the state of the vehicle 202 or a portion thereof.

The vehicle storage circuit 208 can include a functional unit or circuit integral to the vehicle 202 and configured to store and recall information. The vehicle storage circuit 208 can be a volatile memory, a nonvolatile memory, an internal memory, an external memory, or a combination thereof. For example, the vehicle storage circuit 208 can be a nonvolatile storage such as non-volatile random access memory (NVRAM), Flash memory, disk storage, or a volatile storage such as static random access memory (SRAM).

The vehicle storage circuit 208 can store vehicle software, other relevant data, such as input information, information from sensors, processing results, information predetermined or preloaded by the compute system 100 or vehicle manufacturer, or a combination thereof. The vehicle storage circuit 208 can store the information for the on-board diagnostics 222.

The vehicle control circuit 206 can include a function unit or circuit integral to the vehicle 202 and configured to execute or implement instructions. The vehicle control circuit 206 can execute or implement the vehicle software to provide the intelligence of the vehicle 202, the compute system 100, or a combination thereof. The vehicle control circuit 206 can respond to requests for the on-board diagnostics 222. The request can be from other parts of the vehicle 202, the compute system 100, or a combination thereof or external to the compute system 100.

The vehicle control circuit 206 can be implemented in a number of different manners. For example, the vehicle control circuit 206 can be a processor, an application specific integrated circuit (ASIC) an embedded processor, a microprocessor, a hardware control logic, a hardware finite state machine (FSM), a digital signal processor (DSP), or a combination thereof. As a more specific example, the vehicle control circuit 206 can include an engine control unit, one or more central processing unit, or a combination thereof.

The vehicle communication circuit 204 can include a function unit or circuit integral to the vehicle 202 and configured to enable external communication to and from the vehicle 202. For example, the vehicle communication circuit 204 can permit the vehicle 202 to communicate with the first device 102, the second device 106 of FIG. 1, the communication path 104 of FIG. 1, or a combination thereof. The vehicle communication circuit 204 can provide the on-board diagnostics 222 to other portions of the vehicle 202, the compute system 100, or a combination thereof or external to the compute system 100.

The vehicle communication circuit 204 can also function as a communication hub allowing the vehicle 202 to function as part of the communication path 104 and not limited to be an end point or terminal circuit to the communication path 104. The vehicle communication circuit 204 can include active and passive components, such as microelectronics or an antenna, for interaction with the communication path 104. For example, the vehicle communication circuit 204 can include a modem, a transmitter, a receiver, a port, a connector, or a combination thereof for wired communication, wireless communication, or a combination thereof.

The vehicle communication circuit 204 can couple with the communication path 104 to send or receive information directly between the vehicle communication circuit 204 and the first device 102, the second device 106, or a combination thereof as endpoints of the communication, such as for direct line-of-sight communication or peer-to-peer communication. The vehicle communication circuit 204 can further couple with the communication path 104 to send or receive information through a server or another intermediate device in between endpoints of the communication.

The vehicle 202 can further include various interfaces. The vehicle 202 can include one or more interfaces for interaction or internal communication between functional units or circuits of the vehicle 202. For example, the vehicle 202 can include one or more interfaces, such as drivers, firmware, wire connections or buses, protocols, or a combination thereof, for the vehicle storage circuit 208, the vehicle control circuit 206, or a combination thereof.

The vehicle 202 can further include one or more interfaces for interaction with an occupant, an operator or a driver, a passenger, or a combination thereof relative to the vehicle 202. For example, the vehicle 202 can include a user interface including input or output devices or circuits, such as a screen or touch screen, a speaker, a microphone, a keyboard or other input devices, an instrument panel, or a combination thereof.

The vehicle 202 can further include one or more interfaces along with switches or actuators for physically controlling movable components of the vehicle 202. For example, the vehicle 202 can include the one or more interfaces along with the controlling mechanisms to physically perform and control the maneuvering of the vehicle 202, such as for automatic driving or maneuvering features.

The functional units or circuits in the vehicle 202 can work individually and independently of the other functional units or circuits. The vehicle 202 can work individually and independently from the first device 102, the communication path 104, the second device 106, other devices or vehicles, or a combination thereof.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

The environmental sensors 210 are each a device for detecting or identifying environment of the vehicle 202. The environmental sensors 210 can detect, identify, determine, or a combination thereof for the vehicle 202 itself, such as for status or movement thereof. The environmental sensors 210 can detect, identify, determine, or a combination thereof for environment within a cabin of the vehicle 202, an environment external to and surrounding the vehicle 202, or a combination thereof.

For example, the environmental sensors 210 can include a location-movement sensor 212, a visual sensor 214, a radar sensor 216, an accessory sensor 218, a volume sensor 220, or a combination thereof. The location-movement sensor 212 can identify or calculate a geographic location of the vehicle 202, determine a movement of the vehicle 202, or a combination thereof. Examples of the location-movement sensor 212 can include an accelerometer, a speedometer, a GPS receiver or device, a gyroscope or a compass, or a combination thereof. The vehicle 202 can include the environmental sensors 210 other than or in addition to the location-movement sensor 212, such as thermal sensor. The thermal sensor can capture and provide temperature readings for portions of the vehicle 202. The thermal sensor can also capture and provide temperature readings external to the vehicle 202.

The visual sensor 214 can include a sensor for detecting or determining visual information representing the environment external to and surrounding the vehicle 202. The visual sensor 214 can include a camera attached to or integral with the vehicle 202. For example, the visual sensor 214 can include a camera, such as forward facing camera, a rear-view or back-up camera, a side-view or a blind-spot camera, or a combination thereof. Also for example, the visual sensor 214 can include an infrared sensor or a night vision sensor.

The visual sensor 214 can further include a camera on the first device 102 connected to and interacting with the vehicle 202. The visual sensor 214 can further include a cabin camera for detecting or determining visual information inside the vehicle or cabin of the vehicle.

The radar sensor 216 can include an object-detection system, device, or circuit. The radar sensor 216 can determine or identify an existence of an object or a target, such as an obstacle or another vehicle, external to the vehicle 202 a relative location or a distance between the object or the target and the vehicle 202, or a combination thereof.

The radar sensor 216 can utilize radio waves to determine or identify an existence of the object or the target, the relative location or a distance from the vehicle 202, or a combination thereof. For example, the radar sensor 216 can include a proximity sensor or warning system, such as for an area in front of, behind, adjacent to or on a side of, or a combination thereof geographically or physically relative to the vehicle 202.

The accessory sensor 218 can include a sensor for determining or detecting a status of a subsystem or a feature of the vehicle 202. The accessory sensor 218 can determine or detect the status or a setting for windshield wipers, turn signals, gear setting, headlights, or a combination thereof.

The volume sensor 220 can include a sensor for detecting or determining sounds for the vehicle 202. The volume sensor 220 can include a microphone for detecting or determining sounds within a cabin of the vehicle 202. The volume sensor 220 can further include a circuit for detecting or determining a volume level or an output level of speakers within the vehicle 202.

The vehicle 202 can use one or more of the environmental sensors 210 to generate the on-board diagnostics 222 describing or representing information regarding the environment within or surrounding the vehicle 202. The on-board diagnostics 222 can be further processed with the vehicle control circuit 206, stored in the vehicle storage circuit 208, communicated to another device through the vehicle control circuit 206, or a combination thereof.

The vehicle 202 can further include a user device or a mobile device illustrated in FIG. 1. For example, the vehicle 202 can include the first device 102.

As a more specific example, the vehicle communication circuit 204, the vehicle control circuit 206, the vehicle storage circuit 208, the environmental sensors 210, one or more interfaces, or a combination thereof can be included in or make up the first device 102 included in or integral with the vehicle 202. Also as a more specific example, the vehicle 202 can include or be integral with the first device 102 including an embedded compute system, an infotainment system, a smart driving or a driver assistance system, a self-driving or a maneuvering system for the vehicle, or a combination thereof.

Figure 3:
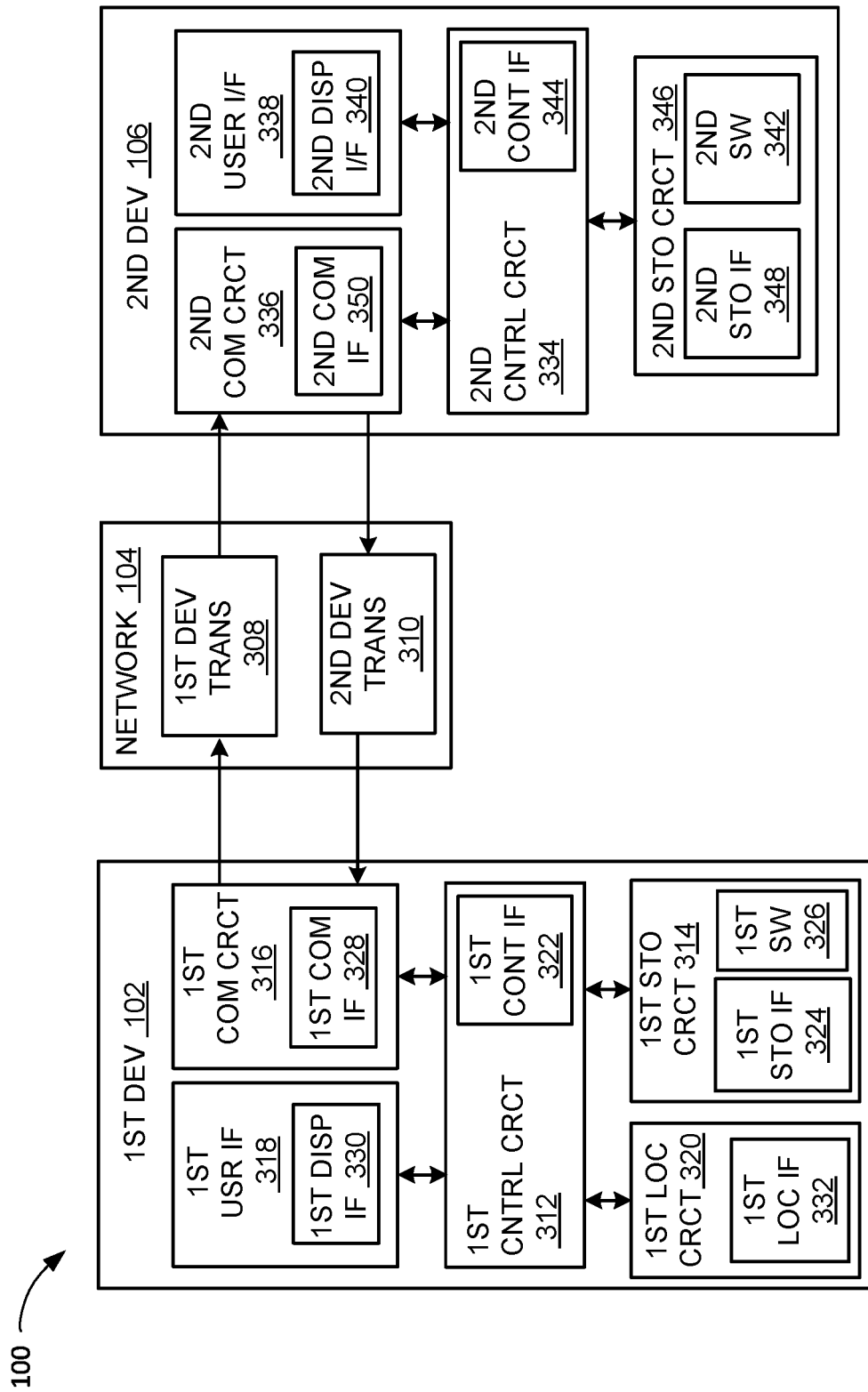
FIG. 3 is an exemplary block diagram of the compute system.

Referring now to FIG. 3, therein is shown an example of a block diagram of the compute system 100. The compute system 100 can include the first device 102, the communication path 104, and the second device 106. The first device 102 can send information in a first device transmission 308 over the communication path 104 to the second device 106. The second device 106 can send information in a second device transmission 310 of FIG. 3 over the communication path 104 to the first device 102.

For illustrative purposes, the compute system 100 is shown with the first device 102 as a client device, although it is understood that the compute system 100 can include the first device 102 as a different type of device. For example, the first device 102 can be a server including a display interface. Also for example, the first device 102 can represent the vehicle 202 of FIG. 2.

Also for illustrative purposes, the compute system 100 is shown with the second device 106 as a server, although it is understood that the compute system 100 can include the second device 106 as a different type of device. For example, the second device 106 can be a client device. Also for example, the second device 106 can represent the vehicle 202.

Further, for illustrative purposes, the compute system 100 is shown with interaction between the first device 102 and the second device 106, although it is understood that the first device 102 can similarly interact another instance of the first device 102. Similarly, the second device 106 can similarly interact with another instance of the second device 106.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control circuit 312, a first storage circuit 314, a first communication circuit 316, and a first user interface 318, and a first location circuit 320. The first control circuit 312 can include a first control interface 322. The first control circuit 312 can execute a first software 326 to provide the intelligence of the compute system 100.

The circuits in the first device 102 can be the circuits discussed in the vehicle 202. For example, the first control circuit 312 can represent the vehicle control circuit 206 of FIG. 2 or vice versa. Also for example, the first storage circuit 314 can represent the vehicle storage circuit 208 of FIG. 2 or vice versa. Further, for example, the first communication circuit 316 can represent the vehicle communication circuit 204 of FIG. 2 or vice versa.

The first control circuit 312 can be implemented in a number of different manners. For example, the first control circuit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control circuit 312 and other functional units or circuits in the first device 102. The first control interface 322 can also be used for communication that is external to the first device 102.

The first control interface 322 can receive information from the other functional units/circuits or from external sources, or can transmit information to the other functional units/circuits or to external destinations. The external sources and the external destinations refer to sources and destinations external to the first device 102.

The first control interface 322 couple can be implemented in different ways and can include different implementations depending on which functional units/circuits or external units/circuits are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage circuit 314 can store the first software 326. The first storage circuit 314 can also store the relevant information, such as data representing incoming images, data representing previously presented image, sound files, or a combination thereof.

The first storage circuit 314 can be a volatile memory, a nonvolatile memory, an internal memory, an external memory, or a combination thereof. For example, the first storage circuit 314 can be a nonvolatile storage such as non-volatile random access memory (NVRAM), Flash memory, disk storage, or a volatile storage such as static random access memory (SRAM).

The first storage circuit 314 can include a first storage interface 324. The first storage interface 324 can be used for communication between the first storage circuit 314 and other functional units or circuits in the first device 102. The first storage interface 324 can also be used for communication that is external to the first device 102.

The first storage interface 324 can receive information from the other functional units/circuits or from external sources, or can transmit information to the other functional units/circuits or to external destinations. The external sources and the external destinations refer to sources and destinations external to the first device 102.

The first storage interface 324 can include different implementations depending on which functional units/circuits or external units/circuits are being interfaced with the first storage circuit 314. The first storage interface 324 can be implemented with technologies and techniques similar to the implementation of the first control interface 322.

The first communication circuit 316 can enable external communication to and from the first device 102. For example, the first communication circuit 316 can permit the first device 102 to communicate with the second device 106 of FIG. 1, an attachment, such as a peripheral device or a desktop computer, and the communication path 104.

The first communication circuit 316 can also function as a communication hub allowing the first device 102 to function as part of the communication path 104 and not limited to be an end point or terminal circuit to the communication path 104. The first communication circuit 316 can include active and passive components, such as microelectronics or an antenna, for interaction with the communication path 104.

The first communication circuit 316 can include a first communication interface 328. The first communication interface 328 can be used for communication between the first communication circuit 316 and other functional units or circuits in the first device 102. The first communication interface 328 can receive information from the other functional units/circuits or can transmit information to the other functional units or circuits.

The first communication interface 328 can include different implementations depending on which functional units or circuits are being interfaced with the first communication circuit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control circuit 312 can operate the first user interface 318 to display information generated by the compute system 100. The first control circuit 312 can also execute the first software 326 for the other functions of the compute system 100, including receiving location information from the first location circuit 320. The first location circuit 320 can also be or function as the location-movement sensor 212 of FIG. 2. The first control circuit 312 can further execute the first software 326 for interaction with the communication path 104 via the first communication circuit 316.

The first location circuit 320 can generate location information, current heading, current acceleration, and current speed of the first device 102, as examples. The first location circuit 320 can be implemented in many ways. For example, the first location circuit 320 can function as at least a part of the global positioning system, an inertial compute system, a cellular-tower location system, a pressure location system, or any combination thereof. Also, for example, the first location circuit 320 can utilize components such as an accelerometer or global positioning system (GPS) receiver.

The first location circuit 320 can include a first location interface 332. The first location interface 332 can be used for communication between the first location circuit 320 and other functional units or circuits in the first device 102. The first location interface 332 can also be used for communication external to the first device 102.

The first location interface 332 can receive information from the other functional units/circuits or from external sources, or can transmit information to the other functional units/circuits or to external destinations. The external sources and the external destinations refer to sources and destinations external to the first device 102.

The first location interface 332 can include different implementations depending on which functional units/circuits or external units/circuits are being interfaced with the first location circuit 320. The first location interface 332 can be implemented with technologies and techniques similar to the implementation of the first control circuit 312.

The second device 106 can be optimized for implementing an embodiment of the present invention in a multiple device embodiment with the first device 102. The second device 106 can provide the additional or higher performance processing power compared to the first device 102. The second device 106 can include a second control circuit 334, a second communication circuit 336, a second user interface 338, and a second storage circuit 346.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340 of FIG. 3. The second display interface 340 can include a display, a projector, a video screen, a speaker, or any combination thereof.

The second control circuit 334 can execute a second software 342 of FIG. 3 to provide the intelligence of the second device 106 of the compute system 100. The second software 342 can operate in conjunction with the first software 326. The second control circuit 334 can provide additional performance compared to the first control circuit 312.

The second control circuit 334 can operate the second user interface 338 to display information. The second control circuit 334 can also execute the second software 342 for the other functions of the compute system 100, including operating the second communication circuit 336 to communicate with the first device 102 over the communication path 104.

The second control circuit 334 can be implemented in a number of different manners. For example, the second control circuit 334 can be a processor, an embedded processor, a microprocessor, hardware control logic, a hardware finite state machine (FSM), a digital signal processor (DSP), or a combination thereof.

The second control circuit 334 can include a second control interface 344 of FIG. 3. The second control interface 344 can be used for communication between the second control circuit 334 and other functional units or circuits in the second device 106. The second control interface 344 can also be used for communication that is external to the second device 106.

The second control interface 344 can receive information from the other functional units/circuits or from external sources, or can transmit information to the other functional units/circuits or to external destinations. The external sources and the external destinations refer to sources and destinations external to the second device 106.

The second control interface 344 can be implemented in different ways and can include different implementations depending on which functional units/circuits or external units/circuits are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

The second storage circuit 346 can store the second software 342. The second storage circuit 346 can also store the information such as data representing incoming images, data representing previously presented image, sound files, or a combination thereof. The second storage circuit 346 can be sized to provide the additional storage capacity to supplement the first storage circuit 314.

For illustrative purposes, the second storage circuit 346 is shown as a single element, although it is understood that the second storage circuit 346 can be a distribution of storage elements. Also for illustrative purposes, the compute system 100 is shown with the second storage circuit 346 as a single hierarchy storage system, although it is understood that the compute system 100 can include the second storage circuit 346 in a different configuration. For example, the second storage circuit 346 can be formed with different storage technologies forming a memory hierarchal system including different levels of caching, main memory, rotating media, or off-line storage.

The second storage circuit 346 can be a volatile memory, a nonvolatile memory, an internal memory, an external memory, or a combination thereof. For example, the second storage circuit 346 can be a nonvolatile storage such as non-volatile random access memory (NVRAM), Flash memory, disk storage, or a volatile storage such as static random access memory (SRAM).

The second storage circuit 346 can include a second storage interface 348. The second storage interface 348 can be used for communication between the second storage circuit 346 and other functional units or circuits in the second device 106. The second storage interface 348 can also be used for communication that is external to the second device 106.

The second storage interface 348 can receive information from the other functional units/circuits or from external sources, or can transmit information to the other functional units/circuits or to external destinations. The external sources and the external destinations refer to sources and destinations external to the second device 106.

The second storage interface 348 can include different implementations depending on which functional units/circuits or external units/circuits are being interfaced with the second storage circuit 346. The second storage interface 348 can be implemented with technologies and techniques similar to the implementation of the second control interface 344.

The second communication circuit 336 can enable external communication to and from the second device 106. For example, the second communication circuit 336 can permit the second device 106 to communicate with the first device 102 over the communication path 104.

The second communication circuit 336 can also function as a communication hub allowing the second device 106 to function as part of the communication path 104 and not limited to be an end point or terminal unit or circuit to the communication path 104. The second communication circuit 336 can include active and passive components, such as microelectronics or an antenna, for interaction with the communication path 104.

The second communication circuit 336 can include a second communication interface 350. The second communication interface 350 can be used for communication between the second communication circuit 336 and other functional units or circuits in the second device 106. The second communication interface 350 can receive information from the other functional units/circuits or can transmit information to the other functional units or circuits.

The second communication interface 350 can include different implementations depending on which functional units or circuits are being interfaced with the second communication circuit 336. The second communication interface 350 can be implemented with technologies and techniques similar to the implementation of the second control interface 344.

The first communication circuit 316 can couple with the communication path 104 to send information to the second device 106 in the first device transmission 308. The second device 106 can receive information in the second communication circuit 336 from the first device transmission 308 of the communication path 104.

The second communication circuit 336 can couple with the communication path 104 to send information to the first device 102 in the second device transmission 310. The first device 102 can receive information in the first communication circuit 316 from the second device transmission 310 of the communication path 104. The compute system 100 can be executed by the first control circuit 312, the second control circuit 334, or a combination thereof. For illustrative purposes, the second device 106 is shown with the partition containing the second user interface 338, the second storage circuit 346, the second control circuit 334, and the second communication circuit 336, although it is understood that the second device 106 can include a different partition. For example, the second software 342 can be partitioned differently such that some or all of its function can be in the second control circuit 334 and the second communication circuit 336. Also, the second device 106 can include other functional units or circuits not shown in FIG. 3 for clarity.

The functional units or circuits in the first device 102 can work individually and independently of the other functional units or circuits. The first device 102 can work individually and independently from the second device 106 and the communication path 104.

The functional units or circuits in the second device 106 can work individually and independently of the other functional units or circuits. The second device 106 can work individually and independently from the first device 102 and the communication path 104.

The functional units or circuits described above can be implemented in hardware. For example, one or more of the functional units or circuits can be implemented using the a gate, circuitry, a processor, a computer, integrated circuit, integrated circuit cores, a pressure sensor, an inertial sensor, a microelectromechanical system (MEMS), a passive device, a physical non-transitory memory medium containing instructions for performing the software function, a portion therein, or a combination thereof.

For illustrative purposes, the compute system 100 is described by operation of the first device 102 and the second device 106. It is understood that the first device 102 and the second device 106 can operate any of the modules and functions of the compute system 100.

Figure 4:
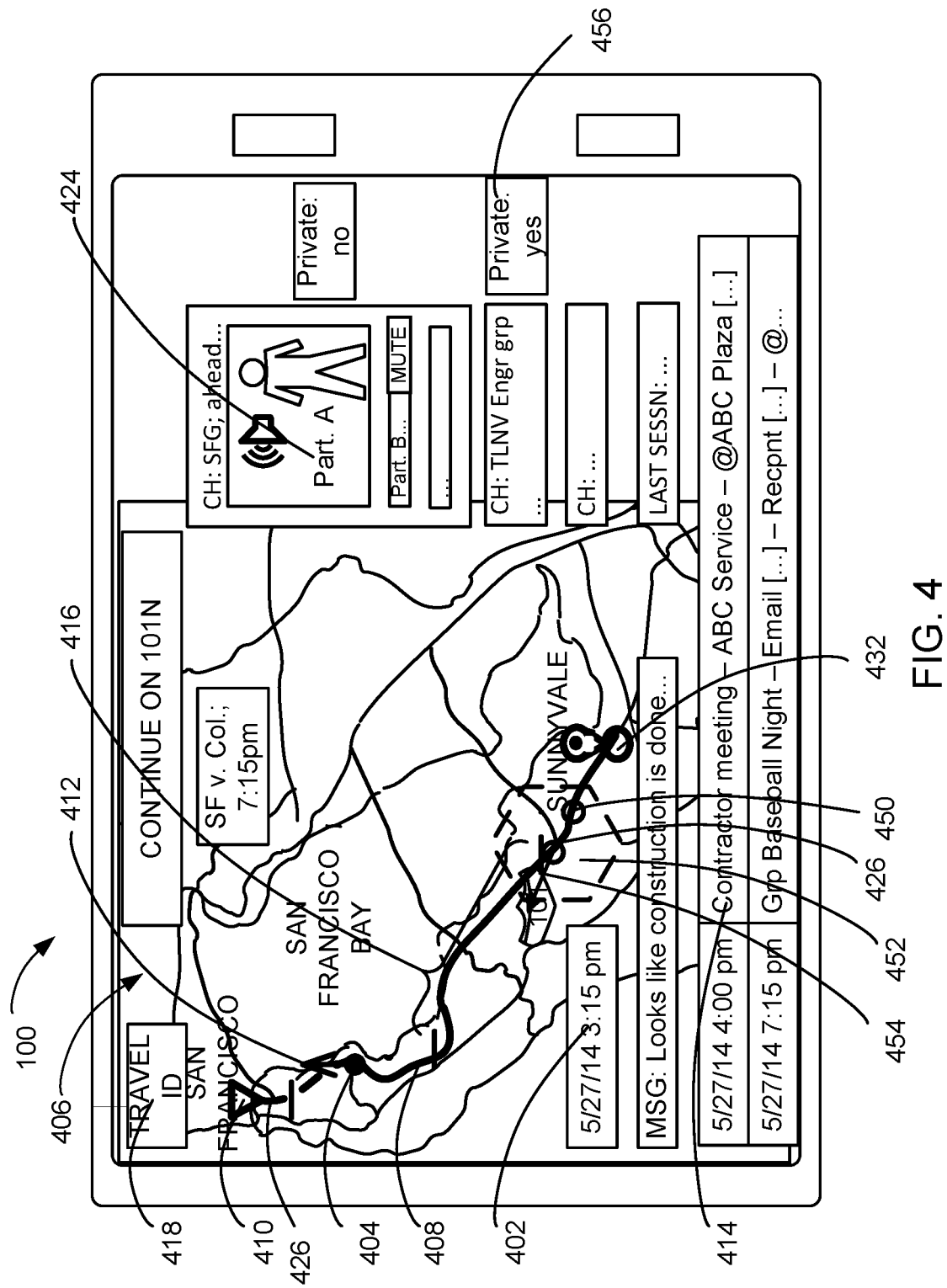
FIG. 4 is a display example of with a travel route.

Referring now to FIG. 4, therein is shown a display example of a travel route 408. In this example, the display example shown in FIG. 4 can represent a display on a fleet manager screen. As a specific example, FIG. 4 can be rendered on the first display interface 330 of FIG. 3 or on the second display interface 340 of FIG. 3 where the fleet management function is running on the first device 102 of FIG. 3, the second device 106 of FIG. 3, or a combination thereof. For brevity, clarity, and convenience, the example display will be described as being rendered on the first device 102 and the vehicle 202 of FIG. 2 is traversing the travel route 408.

The first device 102 can show a time clock 402, a current location 404, or a combination thereof. The time clock 402 provide a demarcation to denote a particular moment. As examples, the time clock 402 can be based on a system clock, a time zone, a server clock, a universal clock, a global clock, a global positioning clock, or a combination thereof. The current location 404 can represent a geographic location for the vehicle 202.

The compute system 100 of FIG. 1 can further include a navigation session 406 for the vehicle 202. The navigation session 406 is provides information associated to travel, services, point-of-interest, or a combination thereof. For example, the navigation session 406 can include an instance of invoking or utilizing the navigational guidance, map, travel-related features or functionalities of the compute system 100, or a combination thereof. The navigation session 406 can be utilized in autonomous driving mode, non-autonomous driving mode, or a combination thereof.

The navigation session 406 can include the travel route 408, a travel destination 410, a travel direction 412, a travel purpose 414, a route segment 416, or a combination thereof. The travel route 408 can include a series of connected paths for traversing to the travel destination 410. The travel route 408 can include one or more travel paths joined by one or more nodes forming a path to the travel destination 410. The travel route 408 can include maneuvers corresponding to the nodes to follow or traverse the travel route 408.

The travel route 408 can also include a starting location 432, a waypoint 450, or a combination thereof in addition to the travel destination 410. The waypoint 450 can represent a stop of the navigation session 406 and a location different from and before reaching the travel destination 410. The waypoint 450 can also be considered the start location 432.

For illustrative purposes, the travel route 408 is described as included as part of the navigation session 406, although the travel route 408 can be independent of the navigation session 406. For example, the navigation session 406 can represent an active guidance or commands for autonomous or non-autonomous driving with navigation instructions to traverse the travel route 408. Also for example, the travel route 408 can also be for a free-drive mode where there is no predefined instance of the travel destination 410, the waypoint 450, the travel direction 412, or a combination thereof. The travel route 408 can be recorded as the vehicle 202 traverses a travel path while in free-drive mode. The travel route 408 can trace the travel path and past readings of the current location 404. In free-drive mode, the compute system 100 can estimated potential instances of the starting point 432, the travel destination 410, the waypoint 450, the travel direction 412, or a combination thereof.

The travel route 408 can be from the current location 404, from the starting location 432 of the navigation session 406, from an arbitrary location as the starting location 432 such as the waypoint 450, or a combination thereof. The starting location 432 can be the initial location for the travel route 408. The travel route 408 can end at the travel destination 410 or include an instance of the travel destination 410 as a stop or an intermediate objective, such as the waypoint 450, within the travel route 408. The travel destination 410 can be an intended location or an objective of the traveling activity.

The travel direction 412 can be information regarding a bearing for a movement or an orientation of the vehicle 202. The travel direction 412 can include the bearing or the orientation relative to the travel route 408.

The travel purpose 414 can be a representation of a reason, a goal, an activity, an objective, or a combination thereof associated with the navigation session 406 or traversing the travel route 408. For example, the travel purpose 414 can include medical stops to pick up medical supplies, treatments, or organs for the travel destination 410 or the travel route 408. Also for example, the travel purpose 414 can include one or more scheduled events or activities at or within a predetermined distance from the travel destination 410.

The route segment 416 can be a unit or a grouping of paths within the travel route 408. The route segment 416 can include paths with common designations, such as a highway number or a street name. The route segment 416 can further be divisions or groupings based on distance or speed, exits or cross streets, number of occupants or travelers, geographical characteristic, such as for region or orientation of the path, path characteristic, such as number of lanes, or traffic regulation, or a combination thereof. The route segment 416 can be unique to each ingress or egress for each of the waypoint 450, the starting location 432, the travel destination 410, or a combination thereof.

In this example, FIG. 4 also depicts a participant identification 424. The participant identification 424 can include a name, a screen name, a contact information, such as phone number of email address, a vehicle information, or a combination thereof. The participant identification 424 can further include a temporary or an anonymous moniker. As a specific example, the participant identification 424 can represent either a person interacting with the compute system 100, a device operating with the compute system 100, the vehicle 202 operating with the compute system 100, or a combination thereof. Further to the specific example, the device or the vehicle operating with the compute system 100 can be associated with the person interacting with the computing system 100, such as a mobile phone or a vehicle assigned or owned by the person.

Returning to the travel route 408 and for example, the compute system 100 can be identify or assign a trip identification 418 for the particular instance of the travel route 408. The trip identification 418 can represent a unique instance, invocation, or traversal of the travel route 408. The trip identification 418 can be different and unique for each and different traversal of the travel route 408.

As a specific example, each instance of the route segment 416 can be designated with the trip identification 418. The trip identification 452 can represent a label for the travel route 408 or a portion of the travel route 408, such as the route segment 416. The travel route 408 can be labeled with a number of different values or labels for the trip identification 452. In other words, the travel route 408 can be labeled with a number of different labels or values of the trip identification 452.

A recurrence 426 represents repeated traversal or stop within the travel route 408. The recurrence 426 can be a portion of the travel route 408, as shown as an example as a dashed portion of the travel route 408 in FIG. 4. The recurrence 426 can also apply repeated presence at or a repeated traversal for the starting location 432, the travel destination 410, the waypoint 450, the navigation session 406, the route segment 416, or a combination thereof. The recurrence 426 can be delineated or uniquely identified with the additional information with the participant identification 424. The recurrence 426 can be further unique per the trip identification 418.

Further, regarding the travel route 408, each traversal to the waypoint 450 can be considered a portion of the travel route 408, a portion of the navigation session 406, or a combination thereof. The waypoint 450 can represent an intermediate destination or the travel destination 410 if the navigation session 406 terminates at the waypoint 450. In this example, the navigation to the waypoint 450 can be considered a micro-trip 454.

The micro-trip 454 can include a navigation or drive to or from the waypoint 450, the travel destination 410, or a combination thereof. The micro-trip 454 can include one instance or multiple instances of the route segment 416. Also as an example, the waypoint 450 for the route segment 416 can be considered the starting location 432 for that particular instance of the route segment 416.

Continuing with the example for micro-trip 454, the trip identification 418 can represent the entirety of the travel route 408, to the waypoint 450, or a combination thereof. The trip identification 418 can include or be broken up to identify traversal to every stop or the waypoint 450 associated with the travel route 408. The trip identification 418 can also be unique to distinguish between the entirety of the travel route 408 and portions of the travel route 408, such as to the waypoint 450 or per the micro-trip 454. As a specific example, each of the micro-trip 454 can also have a unique value for the trip identification 452.

Figure 5:
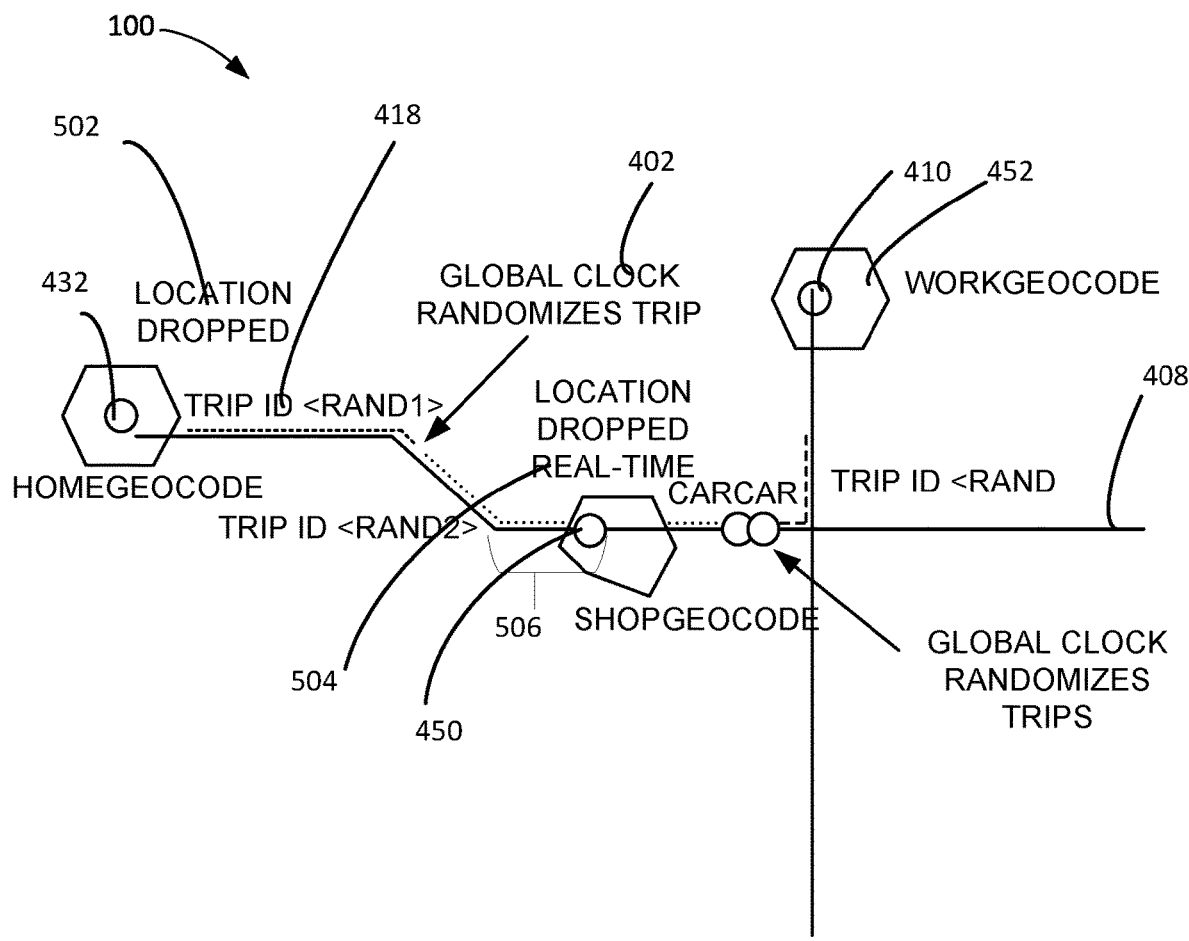
FIG. 5 is an example of an operation of the anonymization mechanism by the compute system.

Referring now to FIG. 5, therein is shown an example of an operation of the anonymization mechanism by the compute system 100. The example shown in FIG. 5 is a simplified view of the travel route 408 with the starting location 432, the waypoint 450, the travel destination 410, or a combination thereof. The example shown in FIG. 5 can for the navigation session 406 of FIG. 4 or with free-drive mode.

In this example, the starting location 432 is shown as a home or home location. The travel destination 410 is shown as a work or as a work location. The waypoint 450 is shown as a shop or a shopping location. The starting location 432, the waypoint 450, the travel destination 410, or a combination thereof can each be identified by a unique designation. As examples, the unique designation can include a geocode, an address, a map location, a cellular triangulation coordinates, or a combination thereof.

A recurrent region 452 is shown associated with or included with each of the starting location 432, the waypoint 450, the travel destination 410, or a combination thereof. The recurrent region 452 is a geographic region used to determine or detect the recurrence 426 of FIG. 4 of a geographic location.

The example shown in FIG. 5, the recurrent region 452 is shown with a geometric shape as a polygon. The recurrent region 452 can be the same or different configuration or shape for the starting location 432, the waypoint 450, the travel destination 410, or a combination thereof.

The recurrent region 452 can be implemented in a number of ways. As other examples, the recurrent region 452 can be depicted based on landscapes, location demarcation such as a mall, or can be defined on different factors and not based solely on geometric configurations, such as circle, oval, or rectangle. For example, the recurrent region 452 can be implemented by a geofence associated with or including the location, such as the starting location 432, the waypoint 450, the travel destination 410, or a combination thereof. The geofence can be implemented based on distance radius from the location, based on a structure as a building, a designation as a town or hospital, or a combination thereof. The recurrent region 452 can be based on a value of the time clock 402 of FIG. 4.

FIG. 5 also depicts the trip identification 418. FIG. 5 depicts a number of devices, such as vehicles for the first device 102 of FIG. 1, the vehicle 202 of FIG. 2, or a combination thereof. FIG. 5 also depicts a number of the devices in the different instances of the recurrent region 452 at different locations. FIG. 5 further depicts a number of different devices as vehicles.

The recurrent region 452 can also represent an anonymization 502 of the location information of the current location 404 of the devices, such as the ones described above. The anonymization 502 is the masking of the current location 404 for privacy protection 456. The privacy protection 456 safeguards geographic location information or presence of the first device 102 of FIG. 1, the vehicle 202 of FIG. 2, or a combination thereof.

The compute system 100 can determine to provide the anonymization 502 in real-time 504. The compute system 100 performs the real-time 504 processing based on the current location 404 of FIG. 4 and triggers for the anonymization 502 with the starting location 432, the waypoint 450, the travel destination 410, or a combination thereof based on the recurrent region 452, the recurrence 426 of FIG. 4, or a combination thereof. The compute system 100 processing in the real-time 504 for the anonymization 502 is based on the reading of the current location 404 and while the traversal of the travel route 408 is still in process and not requiring waiting for the travel route 408 to be completed and the processing for the anonymization 502 is delayed for post-processing.

The compute system 100 performs anonymization functionality or generate the anonymization 502 in situations when the data needs to be kept from being shared in the real-time 504 and the flow of location information for the current location 404 as a location trace. The compute system 100 performs the anonymization 502 for location tracked from moving devices (e.g. cars) that stop or pause at certain places over time during the usage of the compute system 100.

The compute system 100 solves the problem of removing any delay in sharing the data that is often required so that a travel time period 506, such as the last N mins of the trip, can be removed or not recorded or not reported to prevent the starting location 432, the waypoint 450, the travel destination 410, or a combination thereof from being revealed.

The compute system 100 also solves the problem of efficiently allowing the calculation of areas to be dropped from the location trace for trips. The compute system 100 does not require comparison to road databases so that location information is only stored for major roads. The compute system 100 avoids and eliminates offline processing (e.g. overnight) and provides the anonymization 502 in the real-time 504 while avoiding an expensive and slow map database lookup.

The anonymization 502 can be implemented in a number of ways. For example, the anonymization 502 can be implemented by masking or not transmitting the current location 404. Also for example, the anonymization 502 can also represent obfuscating the actual location for the current location 404. Further for example, the anonymization 502 can also delay the reporting or availability of the current location 404. Yet further, for example, the amount of the anonymization 502 can vary based on how close to a location, such as the waypoint 450, the travel destination 410, or a combination thereof. The term close can be measured by distance, time, or landmark boundary, such as city, neighborhood, parking lot, or building. Yet further, for example, the anonymization 502 can be some combination of these examples.

In this example, the current location 404 is shown without the anonymization 502 outside of the recurrent region 452. The anonymization 502 can also be optional or not be performed if the current location 404 within a geofence of the location, such as the starting location 432, the waypoint 450, the travel destination 410, or a combination thereof, is not the recurrence 426 to that specific location, the travel route 408, the route segment 416 of FIG. 4, or a combination thereof. In this example, the geofence can represent the recurrent region 452.

Figure 6:
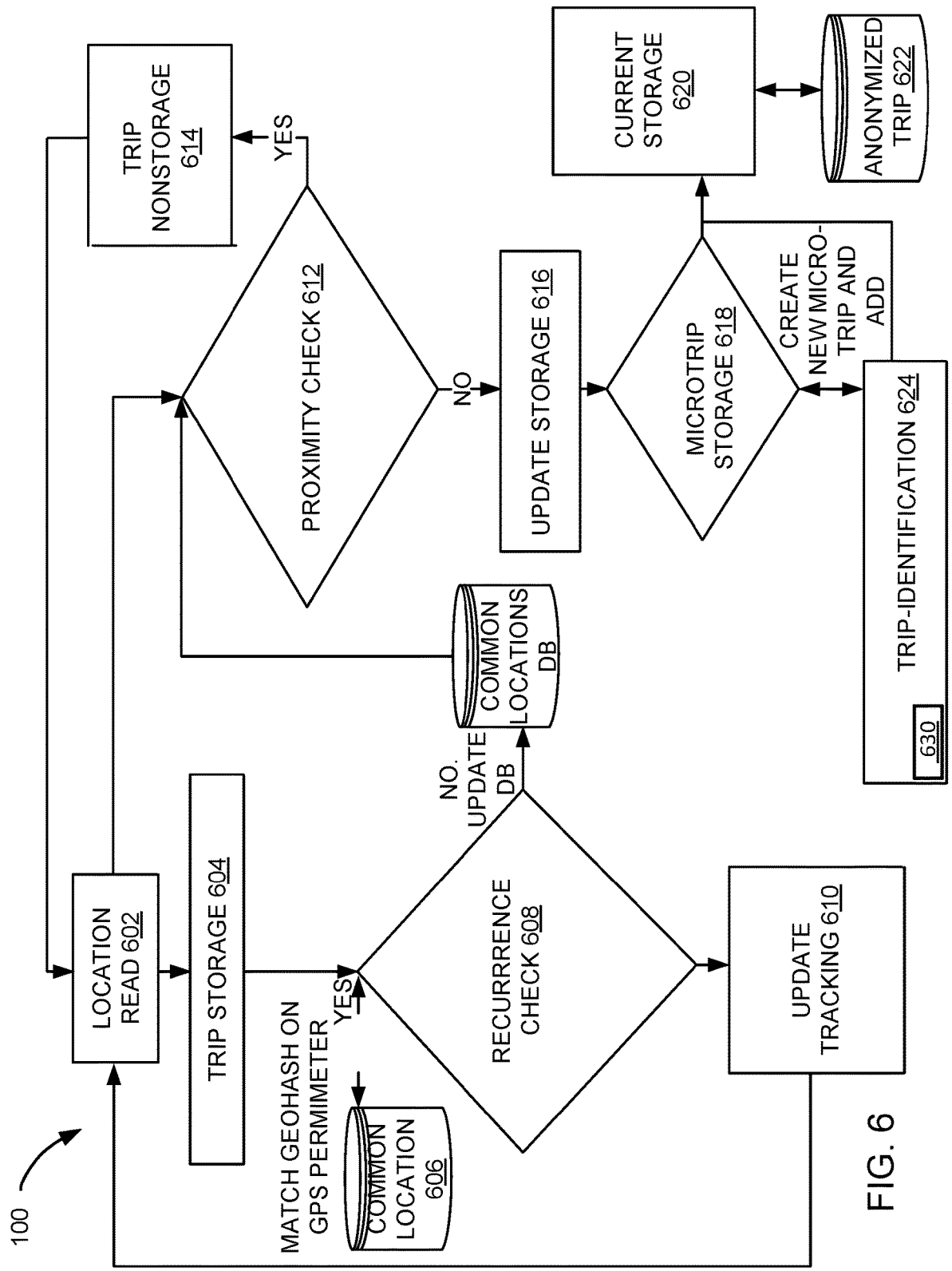
FIG. 6 is an example of a control flow of the compute system.

Referring now to FIG. 6, therein is shown a control flow of the compute system 100. The control flow in FIG. 6 depicts and describes an example of the anonymization mechanism by the compute system 100.

The compute system 100 can include the following modules: a location read module 602, a trip storage module 604, a common location module 606, a recurrence check module 608, an update tracking module 610, a proximity check module 612, a trip nonstorage module 614, an update storage module 616, a microtrip check module 618, a current storage module 620, an anonymized trip module 622, a trip-identification module 624, or a combination thereof. The aforementioned modules can be included in the first software 326 of FIG. 3, the second software 342 of FIG. 3, or a combination thereof. The first software 326, the second software 342, or a combination thereof can be executed with the first control circuit 312 of FIG. 3, the second control circuit 334 of FIG. 3, the vehicle control circuit 206 of FIG. 2, or a combination thereof.

In the example shown in FIG. 6, the location read module 602 can be coupled to the trip storage module 604. The trip storage module 604 can be coupled to the common location module 606. The common location module 606 can be coupled to the recurrence check module 608. The recurrence check module 608 can be coupled to the update storage module 616. The update storage module 616 can be coupled to the microtrip check module 618. The microtrip check module 618 can be coupled to the current storage module 620. The current storage module 620 can be coupled to the anonymized trip module 622. The anonymized trip module 622 can be coupled to the trip-identification module 624.

The modules can be coupled using wired or wireless connections, by including an output of one module as an input of the other module, by including operations of one module influence operation of the other module, or a combination thereof. The modules can be directly coupled with no intervening structures or objects other than the connector there-between, or indirectly coupled. The modules can be coupled as function calls or procedural calls within the first software 326, the second software 342, or a combination thereof.

The location read module 602 reads the current location 404 of FIG. 4. As examples, the location read module 602 can receive the current location 404 from the first location circuit 320 of FIG. 3 the location-movement sensor 212 of FIG. 2, or a combination thereof. The location read module 602 can operate while the vehicle 202 of FIG. 2, as an example, is traversing the travel route 408 of FIG. 4 during the navigation session 406 of FIG. 4, during free-drive mode, or a combination thereof. In this example, the flow can progress from the location read module 602 to the trip storage module 604, the proximity check module 612, or a combination thereof.

Further, the location read module 602 can also assign or set the trip identification 418 of FIG. 4 that is unique for the travel route 408, the route segment 416 of FIG. 4, or a combination thereof, The flow can also progress from the location read module 602 to the recurrence check module 608.

The trip storage module 604 stores information for the travel route 408. The trip storage module 604 can be organized and annotated in a number of ways. For example, the trip storage module 604 can collect information associated to a number of instances for the travel route 408, per the trip identification 418, per the route segment 416, per the micro-trip 454 of FIG. 4, per the participant identification 424 of FIG. 4, or a combination thereof.

The trip storage module 604 can collect location traces or trips for the user over time. The traces or trips can be for the navigation session 406 of FIG. 4 or for free-drive mode. To start anonymized data or the anonymization 502 of FIG. 5, the compute system 100 would need to collect trips or the recurrence 426 of FIG. 4 for a repeated number of times, such as two or more trips. The recurrence 426 can be based on the location or time duration.

For example, the recurrence 426 can be based on the starting location 432 of FIG. 4, the waypoint 450 of FIG. 4, the travel destination 410 of FIG. 4, or a combination thereof. Also for example, the recurrence 426 can be based on the current location 404 of FIG. 4 located at the same location overnight. Further, for example, the recurrence 426 can be for the current location 404 for more than 2 trips to a couple of other destinations (work, school). Yet further, for example, the trip storage module 604 can sort, annotate, or store the recurrence 426 for the current location 404, the travel route 408, the trip identification 418, the route segment 416, the micro-trip 454, the participant identification 424, or a combination thereof for a longer time duration, such as approximately 4 days, before anonymized data or the anonymization 502 can be operations if there are a few trips a day and weekends. The trip storage module 604 can store the information in the common location module 606.

The common location module 606 stores the collection of location traces or trips for the devices or the participant identification 424. For example, the common location module 606 collect a list of common locations or the recurrence 426 for the trip identification 418, the micro-trip 454, the participant identification 424, or a combination thereof. In this example, the recurrence 426 at the starting location 432, the waypoint 450, the travel destination 410, the current location 404, or a combination thereof are places that the vehicle 202 of FIG. 2, as an example, stops or idles for an extended period, such as 5 minutes or more.

The common location module 606 can store the recurrence 426, the starting location 432, the waypoint 450, the travel destination 410, the current location 404, or a combination thereof as common locations. For example, the common location module 606 can store a global positioning system (GPS) location, a cellular triangular coordinates, a range (circular area) or as a full resolution geocode.

As a specific example, each entry or device can include unique identification for the device, such as the vehicle 202. In addition to the information regarding the device, the common location module 606 can also include with each entry the location and the number of the recurrence 426 of FIG. 4 for the specific location.

Using the example shown in FIG. 5, the common location module 606 can include one entry, say for example, the first device 102 as a smartphone. That same entry can include information about the starting location 432, the associated geocode for the starting location 432, the number of the recurrence 426 for the starting location 432 as a home location, or a combination thereof. Similarly, the same entry for that device can include information for the waypoint 450 of FIG. 4, the associated geocode for the waypoint 450, the number of the recurrence 426 for the waypoint 450 as a shop location, or a combination thereof. Also similarly, the same entry for that device can include information for the travel destination 410, the associated geocode for the travel destination 410, the number of the recurrence 426 for the travel destination 410 as a work location, or a combination thereof.

The common location module 606 can store information as a sorted list by frequency of visiting so that the most common locations at the top, front, or most accessible of the data structure. For example, optionally, the common location module 606 can trim or reduce or prioritize the list of common locations to the top "n". The flow can progress from the trip storage module 604 to the recurrent check module 608.

The recurrent check module 608 determines if a beginning or the end of a trip is at a location that has been visited before. The trip can include the travel route 408, the micro-trip 454, the route segment 416, or a combination thereof or portions thereof. As previously described, the starting location 432, the waypoint 450, the travel destination 410, the current location 404, or a combination thereof can be the beginning or the end of the trip.

If the recurrent check module 608 determines the beginning or the end of a trip is not at a location that has been visited before, then the starting location 432, the waypoint 450, the travel destination 410, or a combination thereof is updated with the common location module 606 and the flow can progress to the update tracking module 610. If the recurrent check module 608 determines the beginning or the end of a trip is at a location that has been visited before, then there is no update needed to the common location module 606 and the flow progresses to the update tracking module 610.

The update tracking module 610 continues to track the updated information of the current location 404. The flow can progress from the update tracking module 610 and loop back to the location read module 602.

Returning to the flow to the proximity check module 612, as the first device 102, the vehicle 202 traverses a trip or the travel route 408 in the navigation session 406 or in free-drive mode, the proximity check module 612 can compare the incoming location data with the current location 404 against the common location list in the common location module 606.

If the proximity check module 612 determines the current location 404 is within a common location in the common location module 606, then the flow progresses to the trip nonstorage module 614. If the proximity check module 612 determines the current location 404 is not within a common location in the common location module 606, then the flow progresses to the update storage module 616.

The proximity check module 612 can determine the current location 404 is within the common location module 606 in a number of ways. For example, the proximity check module 612 can determine if the current location 404 is within the recurrent region 452 of FIG. 5.

As a specific example, the proximity check module 612 can utilize the geocode for the current location 404 and the recurrent region 452. In this example, geocodes allow fast location matching because by reducing the number of digits moves to a broader radius and only require a numeric comparison. Also as a specific example, the GPS centroid and radius of the common location can be used to compare if recorded in the common location module 606 in that form.

The trip nonstorage module 614 can drop the data point and continue. The trip nonstorage module 614 drops the current location 404 and not store in the anonymized trip module 622 for the anonymization 502 of FIG. 5. The flow can progress from the trip nonstorage module 614 and loops back to the location read module 602.

The update storage module 616 adds the current location 404, the travel route 408, the waypoint 450, the starting location 432, the travel destination 410, the trip identification 418, the micro-trip 454, or a combination thereof to the current randomized trip for the device. The update storage module 616 can add the information to the anonymized trip module 622. The flow can progress from the update storage module 616 to the microtrip check module 618.

The microtrip check module 618 determines the duration for a determination of the micro-trip for the travel route 408. The microtrip check module 618 can utilize the time clock 402 of FIG. 4 to determine to randomize the travel route 408 or a portion thereof. For example, based on the time clock 402 at N seconds/minutes have past, randomize the trip identification 418 for each ongoing trip at the same time. The randomization for the trip identification 418 creates microtrips for segments of the whole trip or for each of the travel route 408 for each of the vehicles. In other words, randomizing the trip identification 418 is based on trips of two or more vehicles in the same region (geocode area) and cannot be discerned from each other as the next trip segments are interchangable. The route segment 416 can represent the trip segments. This requires a certain density of vehicles to ensure that trips overlap in space/time.

If the microtrip check module 618 determines that randomization of the trip identification 418 is not needed, then the flow can progress to the current storage module 620. If the microtrip check module 618 determines that randomization of the trip identification 418 is needed, then the flow can progress to the trip-identification module 624.

The trip-identification module 624 generates a different value for the trip identification 418 for the micro-trip 454. The value for the trip identification 418 can be used to split a trip or the travel route 408 to the micro-trip 454. The trip-identification module 624 can drop a prior sample 630. The prior sample 630 is the information for the current location 404 as a past sample. Dropping or removing the prior sample 630 of the information for the current location 404 disconnects one of the micro-trip 454 to another. The disconnection of one of the micro-trip 454 to another of the micro-trip 454 further enhances the anonymization 502 and the privacy protection 456 of FIG. 5.

The trip-identification module 624 can further generate a down-resolution for identifying the endpoints of the micro-trip 454 such that the values for the prior sample 630 are harder to associate. For example, down resolution can be for the GPS data for the first and last point for at least one of the micro-trip 454. Also for example, map the start and end points for the micro-trip 454 into the centroid of the geocode mapping for that point or within the recurrent region 452. The mapping process would assign all points to a subset of locations that are nearby and equally spaced based on the geocode resolution used. The trip-identification module 624 can generate a map over the density of data points for the current location 404 or endpoints for the micro-trip 454 in each particular area (geocode). The mapping can be done based on the time clock 402 for the last hour or over the last week. Areas that have low density of trips could then be dropped from the dataset so that these outliers cannot be used to derive personal identifiable information (PII) about the users and for the privacy protection 456.

The flow can progress from the trip-identification module 624 to the current storage module 620. The current storage module 620 stores information for the trip. The current storage module 620 stores the trip identification 418, the current location 404, the travel direction 412 of FIG. 4, speed, or a combination thereof. The current storage module 620 save the information for the trip in the anonymized trip module 622. The compute system 100 can continue to process the trip and the flow can progress from the current storage module 620 back to the location read module 602.

It has been discovered that the compute system 100 also solves the problem of efficiently allowing the calculation of areas to be dropped from the location trace for the current location 404 for the travel route 408, such as trips. The compute system 100 does not require comparison to road databases so that location information is only stored for major roads. The compute system 100 avoids and eliminates offline processing (e.g. overnight) and provides the anonymization 502 in the real-time 504 while avoiding an expensive and slow map database lookup.

The modules described in this application can be hardware implementation or hardware accelerators, including passive circuitry, active circuitry, or both, in the first storage circuit 314, the second storage circuit 346, the first control circuit 312, the second control circuit 334, or a combination thereof. The modules can also be hardware implementation or hardware accelerators, including passive circuitry, active circuitry, or both, within the first device 102, the second device 106, or a combination thereof but outside of the first storage circuit 314, the second storage circuit 346, the first control circuit 312, the second control circuit 334, or a combination thereof.

The compute system 100 has been described with module functions or order as an example. The compute system 100 can partition the modules differently or order the modules differently. For example, the loops can be different or be eliminated.

For illustrative purposes, the various modules have been described as being specific to the first device 102, the second device 106, the vehicle 202, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit or circuit, such as a chip or a processor, or across multiple hardware units or circuits.

The modules described in this application can be stored in the non-transitory computer readable medium. The first storage circuit 314, the second storage circuit 346, or a combination thereof can represent the non-transitory computer readable medium. The first storage circuit 314, the second storage circuit 346, the vehicle storage circuit 208, or a combination thereof, or a portion therein can be removable from the first device 102, the second device 106, the vehicle 202. Examples of the non-transitory computer readable medium can be a non-volatile memory card or stick, an external hard disk drive, a tape cassette, or an optical disk.

The physical transformation of the anonymization 502 in the real-time 504 for the current location 404 of FIG. 4 and triggers for the anonymization 502 with the starting location 432, the waypoint 450, the travel destination 410, the recurrent region 452, the recurrence 426 of FIG. 4, or a combination thereof provide the privacy protection 456 and how the real-world interacts with the computing system 100. In turn, the real-world interactions with the compute system 100 provides a more secure traversal of the travel route 408, whether during the navigation session 406 or during free-mode driving.

Figure 7:
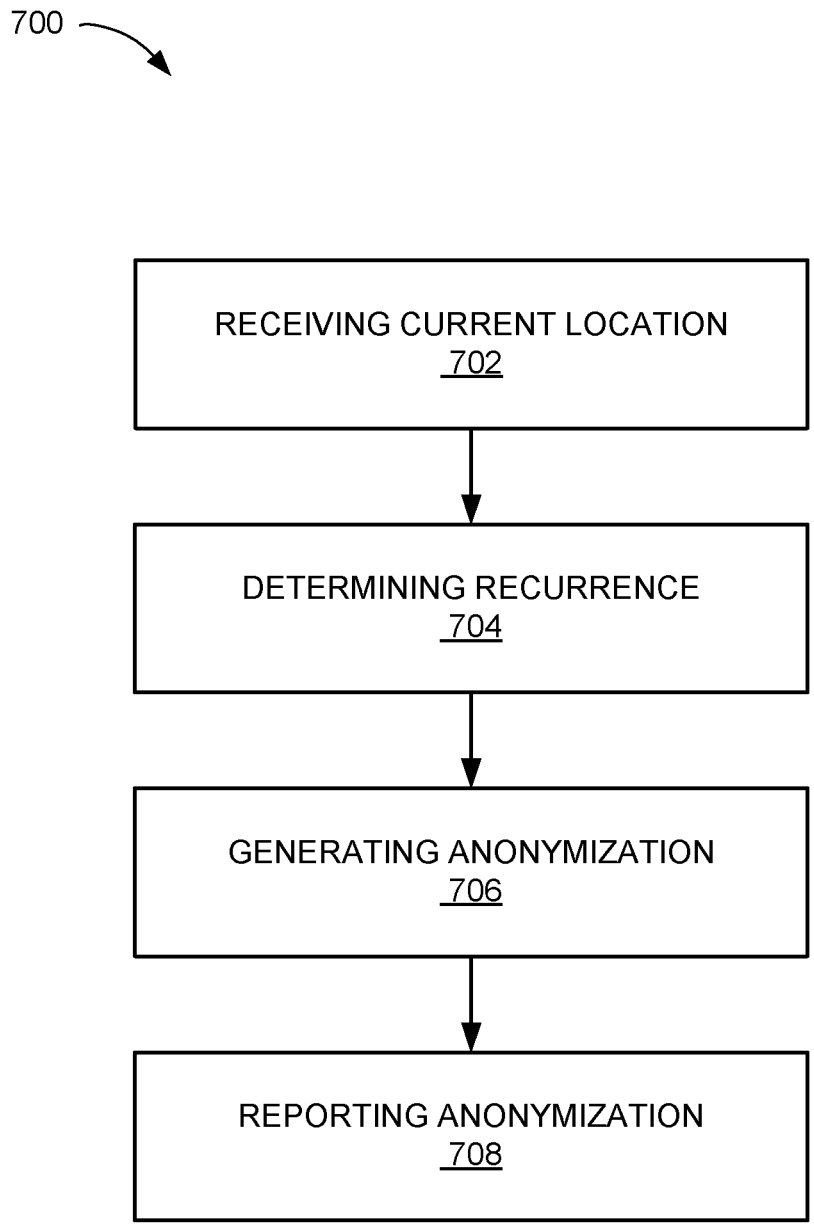
FIG. 7 is a flow chart of a method of operation of a compute system in an embodiment of the present invention.

Referring now to FIG. 7, therein is shown a flow chart of a method 700 of operation of a compute system 70 in an embodiment of the present invention. The method 700 includes: receiving a current location of a device in a box 702; determining a recurrence of the current location within a recurrent region in real-time in a box 704; generating an anonymization of a prior sample of the current location based on the recurrence and the prior sample is based on a travel time period prior to receiving of the current location in a box 706; and reporting the anonymization in the real-time for a privacy protection in a box 708.

As an example, the method 700 further includes not generating the anonymization 502 the current location 404 based on not within the recurrent region 452 in real-time 452. Further as an example, the method 700 includes receiving the current location 404 including receiving the current location 404 of the device 102 traveling along a travel route 408 of FIG. 4 to a travel destination 410 of FIG. 4 and reporting the anonymization 502 in the real-time 504 for the privacy protection 456 includes preventing the travel destination 410 from being revealed.

Also as an example, the method 700 includes receiving a previous location 404 of the device 102 traveling along a travel route 408 to a waypoint 450 of FIG. 4 before a travel destination 410; determining the recurrence 426 of the previous location within the recurrent region 452 for the waypoint 450 in real-time 504; generating the anonymization 502 of the previous location based on the recurrence 426 for the recurrent region 452 for the waypoint 450; reporting the anonymization 502 in the real-time 504 for the privacy protection 456 includes preventing the waypoint 450 from being revealed; and wherein receiving the current location 404 including receiving the current location 404 of the device 102 traveling along the travel route 408 from the waypoint 450 to the travel destination 410.

Yet further as an example, the method 700 includes receiving a previous location 404 of the device 102 traveling along a travel route 408 to a waypoint 450 before a travel destination 410; determining the recurrence 426 of the previous location 404 within the recurrent region 452 for the waypoint 450 in real-time 504; generating the anonymization 502 of the previous location 404 based on the recurrence 426 for the recurrent region 452 for the waypoint 450; reporting the anonymization 502 in the real-time 504 for the privacy protection 456 includes preventing the waypoint 450 from being revealed at a resolution different than for the travel destination 410; and wherein receiving the current location 404 including receiving the current location 404 of the device 102 traveling along the travel route 408 from the waypoint 450 to the travel destination 410.

Still further as an example, the method 700 includes generating the anonymization 502 includes generating the anonymization 502 based on a distance from the recurrent region 452, a time filter when receiving the current location 404, a frequency of the recurrence 426, or a combination thereof. Yet further as an example, the method 700 includes generating the recurrent region 452 based on the recurrence 426 of the current location 404 of the device 102.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation for a compute system comprising:
   receiving a current location of a device while traversing along a travel route;
   determining a recurrence of the current location for the device within a recurrent region in real-time wherein the recurrent region is a repeated traversal of the current location for the device;
   generating an anonymization in real-time of the current location based on the recurrence of the current location is within the recurrent region, the recurrence of the current location a distance from the recurrent region, a frequency of the recurrence of the current location relative to the recurrent region, or a combination thereof; and
   reporting the anonymization in the real-time for a privacy protection and the reporting the anonymization for display on a further device while the traversal along the travel route is still in progress.

2. The method as claimed in claim 1 further comprising not generating the anonymization the current location based on not within the recurrent region in real-time.

3. The method as claimed in claim 1 wherein:
   receiving the current location including receiving the current location of the device traveling along a travel route to a travel destination; and
   reporting the anonymization in the real-time for the privacy protection includes preventing the travel destination from being revealed.

4. The method as claimed in claim 1 further comprising:
   receiving a previous location of the device traveling along a travel route to a waypoint before a travel destination;
   determining the recurrence of the previous location within the recurrent region for the waypoint in real-time;
   generating the anonymization of the previous location based on the recurrence for the recurrent region for the waypoint; and
   wherein:
   receiving the current location including receiving the current location of the device traveling along the travel route from the waypoint to the travel destination; and
   reporting the anonymization in the real-time for the privacy protection includes preventing the waypoint from being revealed.

5. The method as claimed in claim 1 further comprising:
   receiving a previous location of the device traveling along a travel route to a waypoint before a travel destination;
   determining the recurrence of the previous location within the recurrent region for the waypoint in real-time;
   generating the anonymization of the previous location based on the recurrence for the recurrent region for the waypoint; and
   wherein:
   receiving the current location including receiving the current location of the device traveling along the travel route from the waypoint to the travel destination; and
   reporting the anonymization in the real-time for the privacy protection includes preventing the waypoint from being revealed at a resolution different than for the travel destination.

6. A compute system comprising:
   a communication circuit configured to:
      receive a current location of a device while traversing along a travel route;
   a control circuit, coupled to the communication circuit, configured to:
      determine a recurrence of the current location for the device within a recurrent region in real-time wherein the recurrent region is a repeated traversal of the current location for the device,
      generate an anonymization in real-time of the current location based on the recurrence of the current location is within the recurrent region, the recurrence of the current location a distance from the recurrent region, a frequency of the recurrence of the current location relative to the recurrent region, or a combination thereof, and
      report the anonymization in the real-time for a privacy protection and the reporting the anonymization for display on a further device while the traversal along the travel route is still in progress.

7. The system as claimed in claim 6 wherein the control circuit is further configured to not generate the anonymization the current location based on not within the recurrent region in real-time.

8. The system as claimed in claim 6 wherein the control circuit is further configured to:
receive the current location of the device traveling along a travel route to a travel destination; and
report the anonymization in the real-time for the privacy protection includes prevent the travel destination from being revealed.

9. The system as claimed in claim 6 wherein:
the communication circuit is further configured to:
receive a previous location of the device traveling along a travel route to a waypoint before a travel destination;
the control circuit is further configured to:
determine the recurrence of the previous location within the recurrent region for the waypoint in real-time,
generate the anonymization of the previous location based on the recurrence for the recurrent region for the waypoint,
report the anonymization in the real-time for the privacy protection includes preventing the waypoint from being revealed, and
receive the current location including receiving the current location of the device traveling along the travel route from the waypoint to the travel destination.

10. The system as claimed in claim 6 wherein:
the communication circuit is further configured to:
receive a previous location of the device traveling along a travel route to a waypoint before a travel destination,
receive the current location of the device traveling along the travel route from the waypoint to the travel destination;
the control circuit is further configured to:
determine the recurrence of the previous location within the recurrent region for the waypoint in real-time;
generate the anonymization of the previous location based on the recurrence for the recurrent region for the waypoint; and
report the anonymization in the real-time for the privacy protection includes preventing the waypoint from being revealed at a resolution different than for the travel destination.

11. A non-transitory computer readable medium including instructions executable by a control circuit for a compute system comprising:
receiving a current location of a device while traversing along a travel route;
determining a recurrence of the current location for the device within a recurrent region in real-time wherein the recurrent region is a repeated traversal of the current location for the device;
generating an anonymization in real-time of the current location based on the recurrence of the current location is within the recurrent region, the recurrence of the current location a distance from the recurrent region, a frequency of the recurrence of the current location relative to the recurrent region, or a combination thereof; and
reporting the anonymization in the real-time for a privacy protection and the reporting the anonymization for display on a further device while the traversal along the travel route is still in progress.

12. The non-transitory computer readable medium as claimed in claim 11 further comprising not generating the anonymization the current location based on not within the recurrent region in real-time.

13. The non-transitory computer readable medium as claimed in claim 11 wherein:
receiving the current location including receiving the current location of the device traveling along a travel route to a travel destination; and
reporting the anonymization in the real-time for the privacy protection includes preventing the travel destination from being revealed.

14. The non-transitory computer readable medium as claimed in claim 11 further comprising:
receiving a previous location of the device traveling along a travel route to a waypoint before a travel destination;
determining the recurrence of the previous location within the recurrent region for the waypoint in real-time;
generating the anonymization of the previous location based on the recurrence for the recurrent region for the waypoint; and
wherein:
receiving the current location including receiving the current location of the device traveling along the travel route from the waypoint to the travel destination; and
reporting the anonymization in the real-time for the privacy protection includes preventing the waypoint from being revealed.

15. The non-transitory computer readable medium as claimed in claim 11 further comprising:
receiving a previous location of the device traveling along a travel route to a waypoint before a travel destination;
determining the recurrence of the previous location within the recurrent region for the waypoint in real-time;
generating the anonymization of the previous location based on the recurrence for the recurrent region for the waypoint; and
wherein:
receiving the current location including receiving the current location of the device traveling along the travel route from the waypoint to the travel destination; and
reporting the anonymization in the real-time for the privacy protection includes preventing the waypoint from being revealed at a resolution different than for the travel destination.

* * * * *